(12) United States Patent
Cook et al.

(10) Patent No.: US 8,008,964 B1
(45) Date of Patent: Aug. 30, 2011

(54) VARIABLE INPUT VOLTAGE CHARGE PUMP

(75) Inventors: Thomas D. Cook, Austin, TX (US);
Jeffrey C. Cunningham, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/723,214

(22) Filed: Mar. 12, 2010

(51) Int. Cl.
*G05F 1/10* (2006.01)

(52) U.S. Cl. .......................................... 327/536; 363/60

(58) Field of Classification Search .................. 327/536; 363/59–60
See application file for complete search history.

(56) References Cited

U.S. PATENT DOCUMENTS

| | | | |
|---|---|---|---|
| 7,279,959 B1 * | 10/2007 | Choy | 327/536 |
| 7,512,008 B2 | 3/2009 | Chan et al. | |
| 7,518,892 B2 | 4/2009 | Kitagawa et al. | |
| 7,548,441 B2 | 6/2009 | Vinciarelli | |
| 7,558,129 B2 | 7/2009 | Thorp et al. | |
| 7,733,162 B2 * | 6/2010 | Kim et al. | 327/536 |
| 7,889,523 B2 * | 2/2011 | Cook et al. | 363/59 |
| 2001/0017566 A1 * | 8/2001 | Nakahara | 327/536 |
| 2008/0084239 A1 * | 4/2008 | Oswald et al. | 327/536 |
| 2009/0091376 A1 * | 4/2009 | Kim et al. | 327/536 |
| 2009/0097285 A1 | 4/2009 | Cook et al. | |
| 2009/0200956 A1 * | 8/2009 | Kojima | 315/291 |
| 2010/0134177 A1 * | 6/2010 | Hsu et al. | 327/536 |
| 2011/0050326 A1 * | 3/2011 | Cook et al. | 327/536 |

* cited by examiner

*Primary Examiner* — Thomas J Hiltunen
(74) *Attorney, Agent, or Firm* — James L. Clingan, Jr.; Ranjeev Singh

(57) ABSTRACT

A device for providing a constant output voltage based on a variable input voltage is provided. The device may include: (1) a charge-pump comprising a plurality of cells, wherein each of the plurality of cells can be configured as an input cell, a stepping cell, or a load cell; (2) a comparator; and (3) a differentiator coupled to the comparator output, wherein the differentiator is configured to monitor the comparator output and produce a reset pulse each time the comparator output changes its state. The device may further include: (1) a decimator; (2) an up/down counter; and (3) a controller for detecting whether the device is operating in a first predetermined mode or a second predetermined mode, wherein the two modes relate to the configuration of the plurality of cells into the input cell, the stepping cell, and/or the load cell.

20 Claims, 14 Drawing Sheets

VARIABLE INPUT VOLTAGE CHARGE PUMP

BACKGROUND

1. Field

This disclosure relates generally to charge pumps, and more specifically, to variable input voltage charge pumps.

2. Related Art

With the proliferation of battery powered products in medical, consumer and industrial applications the variety of power supply voltages available for integrated circuits has increased. In previous products the power supply voltages have generally been greater than or equal to the integrated circuit's supply voltage requirement. Recently, however, in many battery-powered applications the product supply voltage may at one time be greater than the supply voltage required by the integrated circuit and at another time be less than the required supply voltage. As a consequence, the need for circuits that can change a range of voltages to the well-regulated voltage required by an integrated circuit has increased. These circuits must address a number of design challenges.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
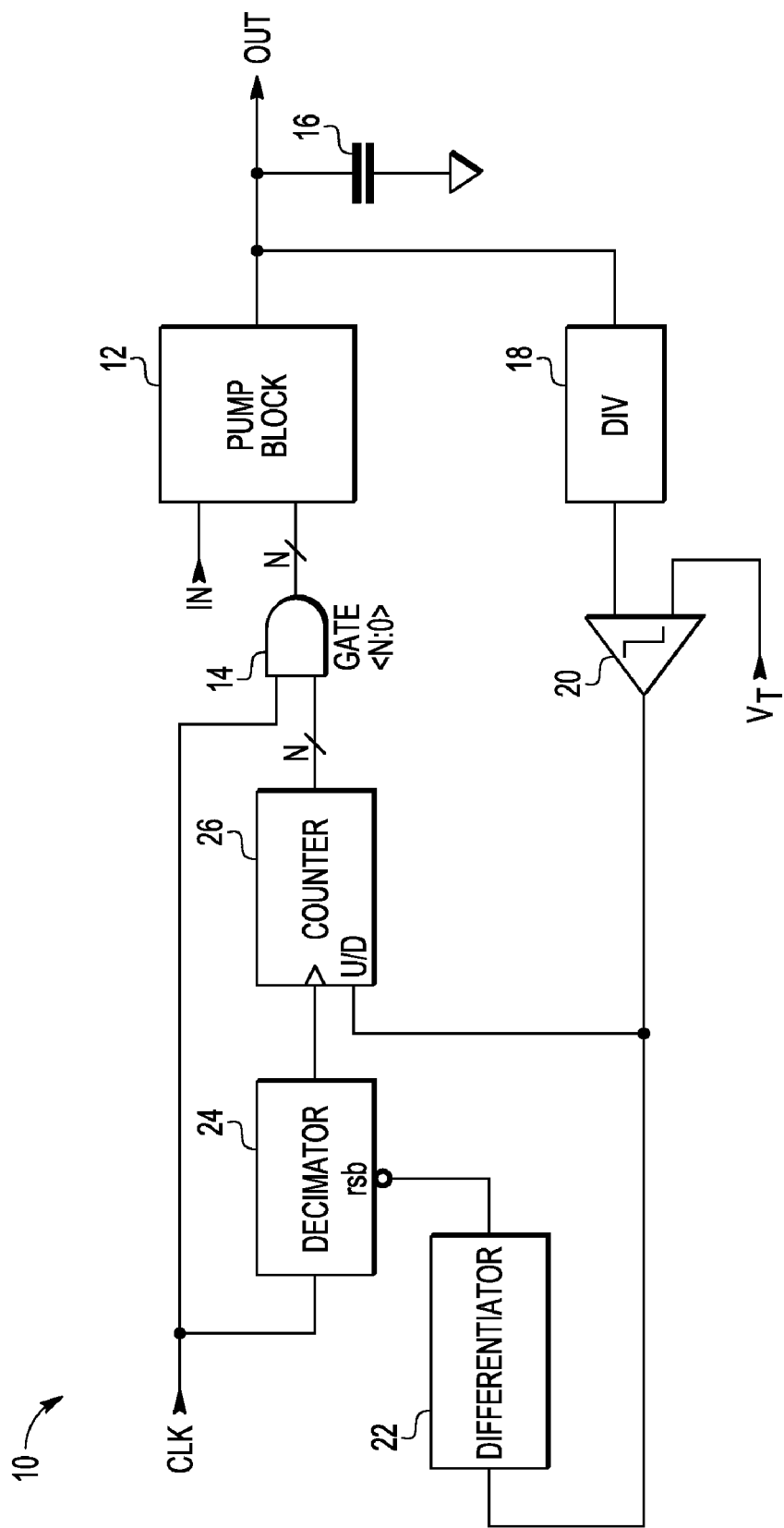
FIG. 1 is a block diagram of a charge-based voltage multiplier implemented using the prior art.

FIG. 1 is a block diagram of a voltage multiplier 10 in the prior art. The voltage multiplier includes a pump block 12, pump control logic 14, a smoothing capacitor 16, a voltage divider 18, a comparator 20, a differentiator 22, a decimator 24, and a counter 26. Pump block 12 receives an input voltage (In) and provides a regulated voltage output (Out) that is greater than the input voltage. Divider 18 provides a portion of the output voltage to comparator 20, the output state of which is the sign of the difference between the divider output and a threshold voltage input (Vt). Each time the output state of comparator 20 changes differentiator 22 resets decimator. If differentiator 22 does not reset decimator 22, decimator 24 will clock the counter at a frequency lower than the clock (clk) frequency. The output state of comparator 20 determines whether counter 26 increments or decrements by controlling the "u/d" input of counter 26. The counter output is applied to pump control logic 14 that gates the clock to the cells of pump block 12.

Figure 2:
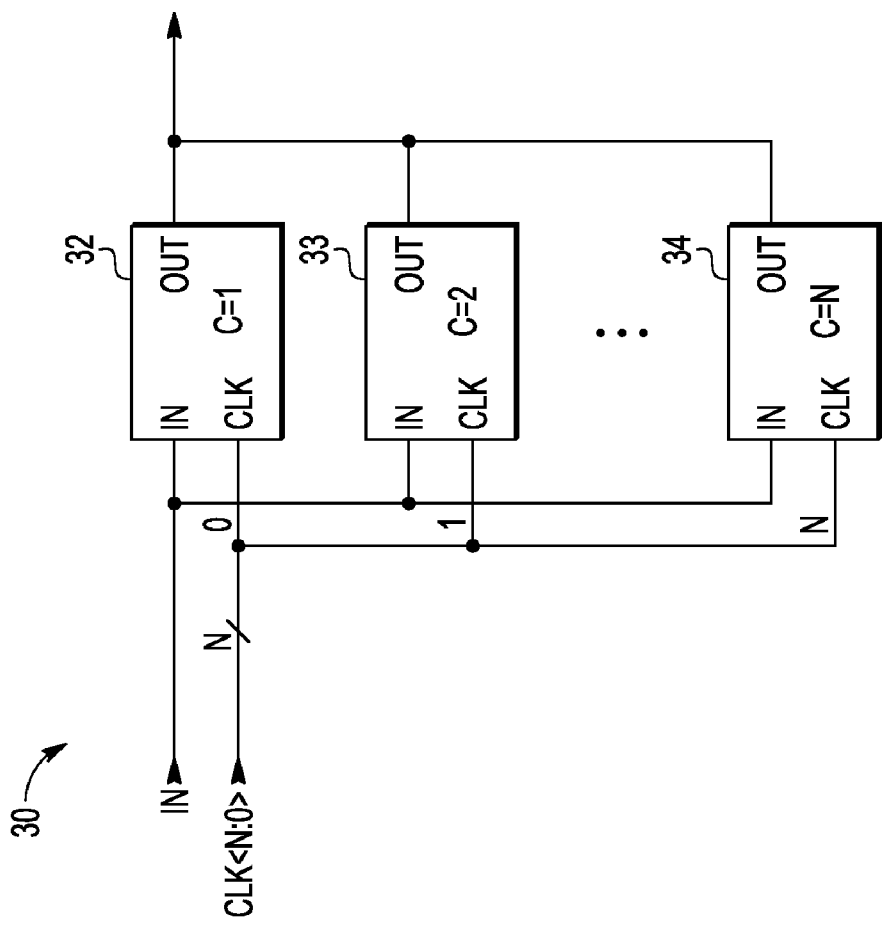
FIG. 2 is a block diagram of a pump block of the prior art used in the charge-based voltage multiplier shown in FIG. 1.

FIG. 2 shows cells 30, which includes pump cell 32, pump cell 33, pump cell 34 and others not shown, of pump block 12 of FIG. 1. The capacitance value in each pump cell 32-34 is different and the capacitance values in pump cells 32-34 are in a binary relationship. Thus the second cell, which is pump cell 33, will contain twice the capacitance value of the first cell, which is pump cell 32, the third cell will contain twice the capacitance value of the second cell, and so on until the last cell, which will contain twice the capacitance value of the next to last cell. Each cell receives the input clock gated by one bit of the counter output as shown in FIG. 1. As the counter output changes the total amount of clocked capacitance changes; because of the binary weighting of the capacitance in the cells the change of clocked capacitance for each counter output change will be constant.

Figure 3:
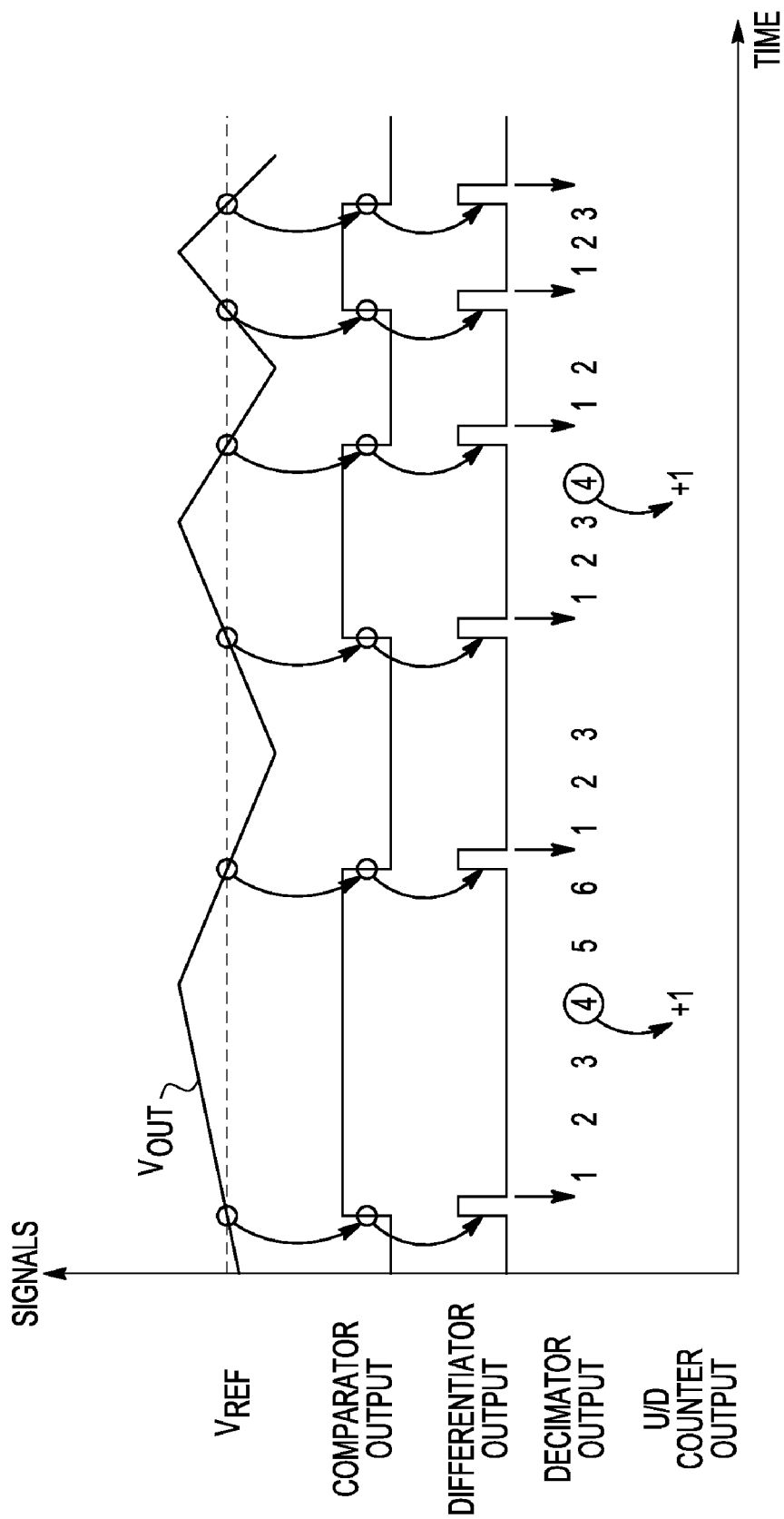
FIG. 3 is an illustration of the relationship between the various signals of the charge-based multiplier shown in FIG. 1.

FIG. 3 illustrates some of the control signals of the charge-based voltage multiplier of FIG. 1. When the output Out increases to values greater than the reference voltage (Vref) the comparator output state changes, causing differentiator 22 to generate a pulse that resets decimator 24. As long as the output is greater than the reference each succeeding clock increments decimator 24 until the decimator output changes, clocking counter 26. The output state of comparator 20 affects an increase in the counter value, which decreases the total value of clocked capacitance in the pump block. A decrease in the clocked capacitance decreases the available current, which causes a decrease in the output voltage. Eventually the output voltage Out will be less than the reference voltage Vt causing differentiator 22 to generate a pulse, which resets decimator 24. While the output voltage is less than the reference voltage Vt, decimator 24 will increment at each succeeding clock. Eventually the output changes, clocking the counter. The state of the comparator output effects a decrease in the counter value, which increases the total value of clocked capacitance in pump block 12. This increases the current available for the load, which in turn increases the output voltage Out.

Figure 4:
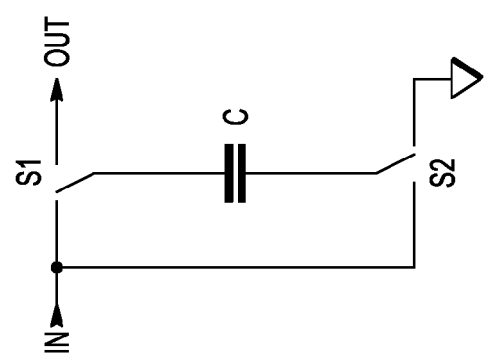
FIG. 4 is a diagram of the charge pump cell in the prior art used in the pump block shown in FIG. 2.

FIG. 4 contains a charging capacitor C and switches S1 and S2 of the pump cell in the prior art. Switch S1 connects one terminal of capacitor C to either the input or the output. Switch S2 connects the other terminal of the capacitor to either the input or Vss. When S1 connects one terminal of the capacitor to the input S2 connects the other terminal of the capacitor to Vss. Capacitor C receives a charge equal to the product of the voltage, In, and the capacitance value. When S1 connects one terminal of the capacitor to the output S2 connects the other terminal of the capacitor to the input. Charge is transferred from the pump cell capacitor to the smoothing capacitor such as capacitor 16 shown in FIG. 1. The amount of charge transferred will be proportional to the difference of twice input voltage In and output voltage Out and also to the ratio of charging capacitor C and the smoothing capacitor. When the circuit reaches steady state output voltage Out will be twice the input voltage and no charge will be transferred.

Figure 5:
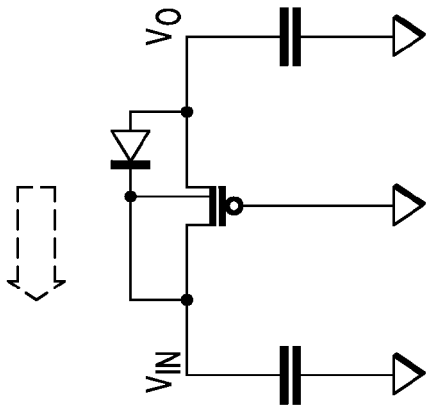
FIG. 5 is a diagram, according to the prior art, of the transistors that might realize the switches in the pump cell of FIG. 4 showing the possible bulk connections and the inherent parasitic diodes.
Figure 5:
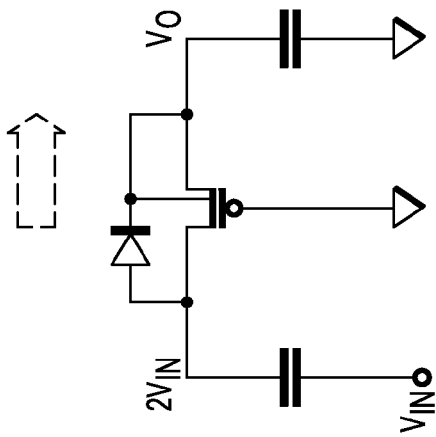

FIG. 5 shows the transistors that comprise one embodiment of the switches in the pump cell in the prior art. When the gate of the transistor is forced to a voltage less than the voltage on either the drain or source node the transistor conducts current and the switch is closed. When the gate voltage of the transistor is greater than the voltages of both the drain and source nodes the transistor does not conduct current and the switch is open. Also shown are two possible connections of the bulk of the transistor and the inherent parasitic diodes. In the prior art the bulk is connected to the output node so that the diode is forward biased only when the highest voltage on the terminals of the charging capacitor is greater than the output voltage. When this condition occurs it will enhance the pumping action, particularly during start-up when the transistor does not conduct. During steady state operation the highest voltage on the terminals of the charging capacitor will be close to the output voltage and the diode will not forward bias. If the output voltage is greater than the input voltage the diodes also will not forward bias when the pump cell is in the charging mode of operation so no current will flow from the output to the charging capacitor or from the input to the output.

While connection of the bulk node to the output is preferred when the input voltage is less than the steady state output voltage, i.e. the voltage multiplier mode of operation, the parasitic diode will always conduct current from the input to the output if the input voltage is greater than the steady state output. In that case the output voltage will be approximately equal to the input voltage unless the impedance of the load is on the same order of magnitude as the impedance of the forward biased diode. The power efficiency in that mode of operation is very poor and the output is not regulated.

Also shown in FIG. 5 is an alternate connection for the bulk node. If the bulk node is connected to the input, the parasitic diode will not forward bias when the input voltage is greater than the output voltage. However, when the input voltage is less than the required output voltage, e.g. the initial pumping mode of operation, the parasitic diode will conduct current from the output to the input and the output will never obtain the required voltage.

If the input voltage is high the voltage multiplier mode of operation may also cause device breakdowns. When the capacitor is charged to a voltage equal to the input voltage and S2 in FIG. 4 connects one of the terminals of the capacitor to the input voltage the transistors in S1 in FIG. 4 will be subjected to a voltage equal to twice the input voltage. Depending on the input voltage and the device characteristics this may cause a breakdown in the diffusions or gate of the switch transistors.

Figure 6:
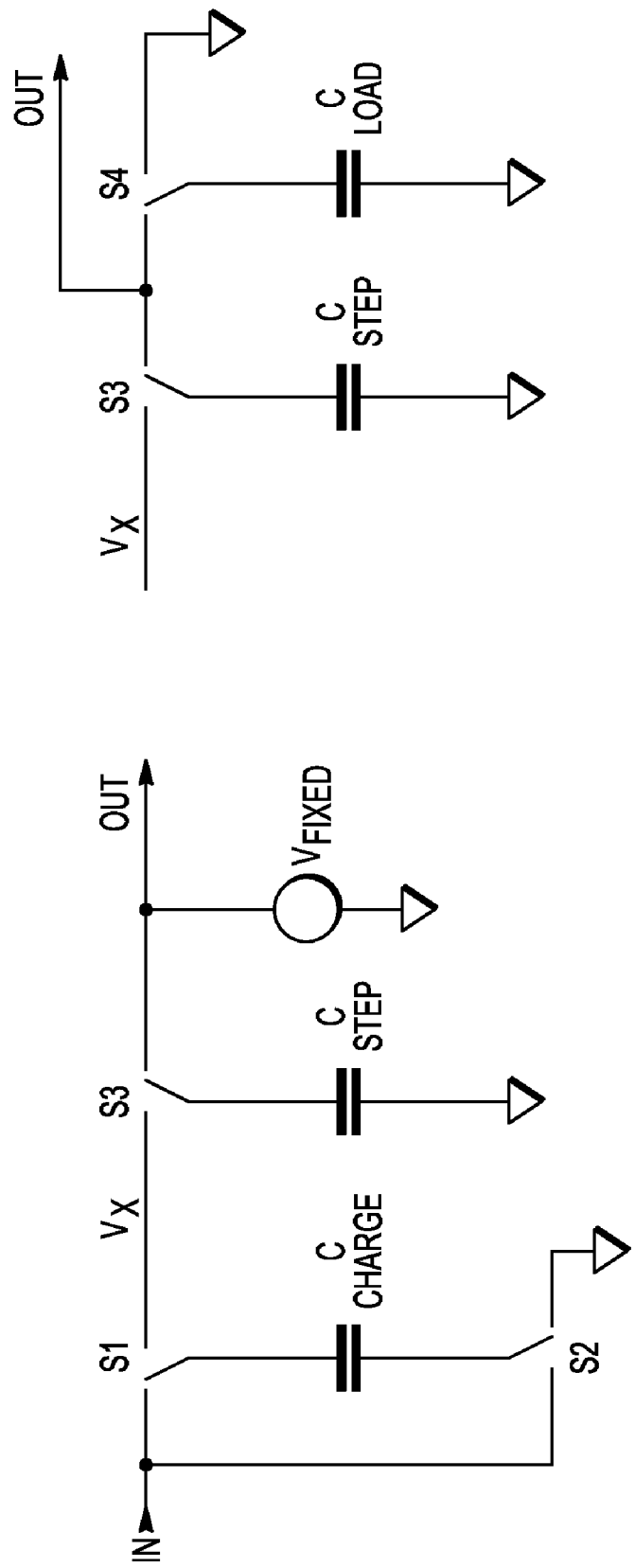
FIG. 6 contains two circuits that demonstrate charge stepping fundamentals for a first operational mode.

FIG. 6 illustrates the charge stepping technique that addresses the breakdown and bias issues of the prior art. A capacitor (Ccharge) and switches S1 and S2 perform in a manner similar to the prior art. Another capacitor (Cstep) and switch S3 transfer charge between the intermediate voltage (Vx) and a fixed voltage (Vfixed) that is connected to the output. During the initial clock phase S1 connects one terminal of Ccharge to the input (In), S2 connects the other terminal of Ccharge to Vss, and S3 connects one terminal of Cstep to the output voltage. The second terminal of Cstep is always connected to Vss. Ccharge receives a charge equal to the product of the capacitor value and the input voltage. Cstep receives a charge equal to the product of the capacitor value and the value of Vfixed. During the second clock phase S1 connects one terminal of Ccharge to the intermediate voltage Vx, S2 connects the other terminal of Ccharge to In, and S3 connects a terminal of Cstep to the intermediate voltage Vx. The charge on Ccharge will be the product of the difference between the intermediate voltage Vx and the input voltage In and the capacitance value. The charge on Cstep will be the product of the intermediate voltage Vx and the capacitance value.

Because of charge conservation the charge gained or lost by Ccharge during the two phases of operation must equal the charge gained or lost by Cstep during the two phases of operation. Therefore the equation that determines the steady state value of the intermediate voltage Vx is:

$$V_x = V_o + \frac{Ccharge}{Ccharge + Cstep} * (2V_{in} - V_o)$$

The voltage Vx will be close to Vo when Cstep>>Ccharge and close to twice Vin when Cstep equals zero. If Ccharge and Cstep are on the same order of magnitude the intermediate voltage Vx will be greater than both the input and the output voltage. This means that the bulks of the switch transistors can be connected to the intermediate voltage Vx and the parasitic diodes will not forward bias. In addition, since the intermediate voltage Vx is always less than twice the input voltage the input voltage can be greater than input voltages that cause breakdowns in the charge pumps of the prior art. For maximum charge transfer efficiency the values of Ccharge and Cstep should be equal.

FIG. 6 also shows how a capacitor Cload and switch S4 can replace the voltage source Vfixed. The charge movement through Cstep was described previously. During one clock phase Cload obtains a charge equal to the product of the output voltage and the value of Cload. During the second switch phase all charge on Cload is removed. Because of charge conservation the charge change in Cstep must equal the charge change in Cload. Therefore the steady-state equation that describes the operation of this circuit is:

$$V_o = \frac{Cstep}{Cstep + Cload} * V_x$$

For any available intermediate voltage capacitance values can be selected to obtain any desired output. If Cload>>Cstep the output voltage will equal zero; if Cstep>>Cload then Vo approaches Vx.

Figure 7:
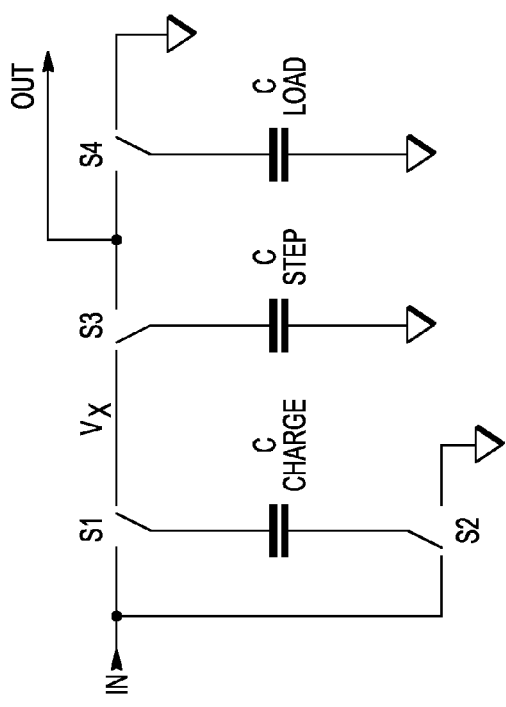
FIG. 7 is a circuit that combines the two circuits of FIG. 6 to further demonstrate the charge stepping fundamentals for the first operational mode.

FIG. 7 shows the first operational mode of the present invention in a switch and capacitor schematic realization.

Figure 8:
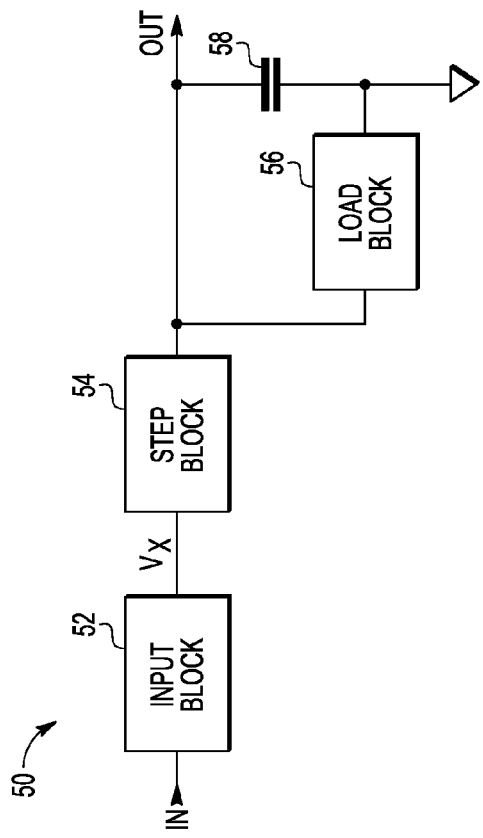
FIG. 8 is a block diagram of the circuit in FIG. 7.

FIG. 8 shows the first operational mode in block format shown as charge pump 50 comprising an input block 52, a step block 54, a load block 56, and a smoothing capacitor 58. Input block 52 may be called Ccharge, step block 54 may be called Cstep, and load block 56 may be called Cload. Ccharge, Cstep, Cload, and their associated switches are used together to change a range of input voltages to a single output voltage. By adjusting the values of the capacitors the output voltage will remain constant as the input voltage or the load vary as can be seen in the steady state equation for the block:

$$V_o = \frac{2C_x}{Cload + C_x} Vin \text{ where } Cx = \frac{Ccharge * Cstep}{Ccharge + Cstep}$$

While the circuit illustrated in FIG. 7 is preferred when an input voltage is greater than the required regulated voltage or the load is not severe, it is inefficient when the input voltage is less than the output voltage and the load is severe (for light loads the first operational mode usually performs adequately). The combination of Ccharge and Cstep results in half the charge transfer than could be realized using Ccharge alone.

Figure 9:
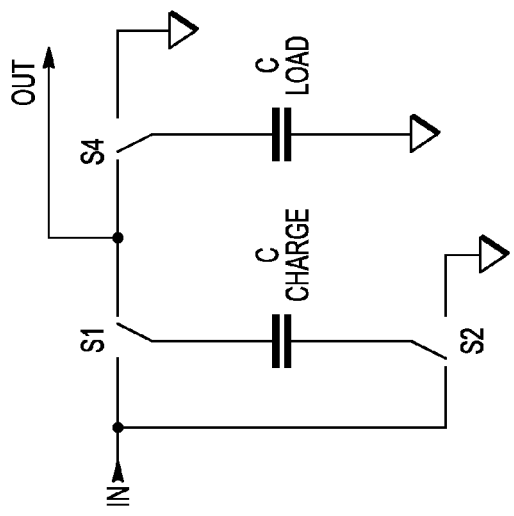
FIG. 9 is a circuit that demonstrates charge stepping fundamentals for a second operational mode.

FIG. 9 illustrates the preferred method when the input voltage is less than the output voltage in a switch and capacitor schematic format.

Figure 10:
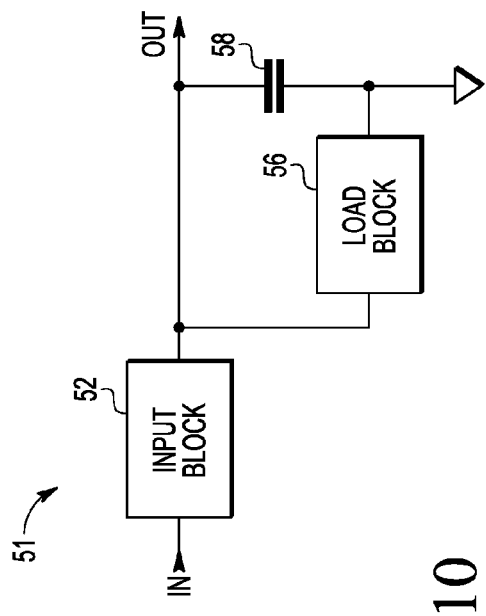
FIG. 10 is a block diagram of the circuit in FIG. 9.

FIG. 10 shows the method illustrated in FIG. 9 in block format and shown as charge pump 51 comprising input block 52 and load block 56. This configuration, charge pump 51, is the second mode of operation. Only Ccharge and Cload are present in charge pump 51; Cstep is not included. The Cstep capacitor can be removed by closing a switch that connects the intermediate voltage node Vx to the output node. In that case the Cstep capacitor is effectively added to the smoothing capacitor of FIG. 1. It can also be distributed between Ccharge and Cload. Since the number of clocked input cells, clocked load cells, and clocked stepping cells is changed by the regulation circuitry, a cell that can be reconfigured as either an input, stepping or load cell will make more efficient use of space. If a pump cell is not needed as a load cell, for example, it can be reconfigured as a stepping or an input cell instead of being left unclocked.

Figure 11:
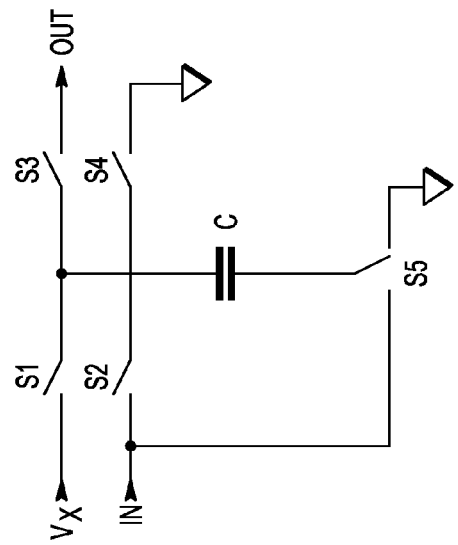
FIG. 11 is a pump sub-cell circuit that can be configured as an input, step, or load cell.

FIG. 11 is a pump sub-cell that can be configured as either an input cell, a stepping cell, or a load cell. Switches S1, S2, S3, and S4 connect one terminal of a capacitor to the input, the intermediate voltage Vx, the output voltage Out, or Vss. Switch S5 connects the other terminal of the capacitor to either the input voltage or Vss.

Figure 12:
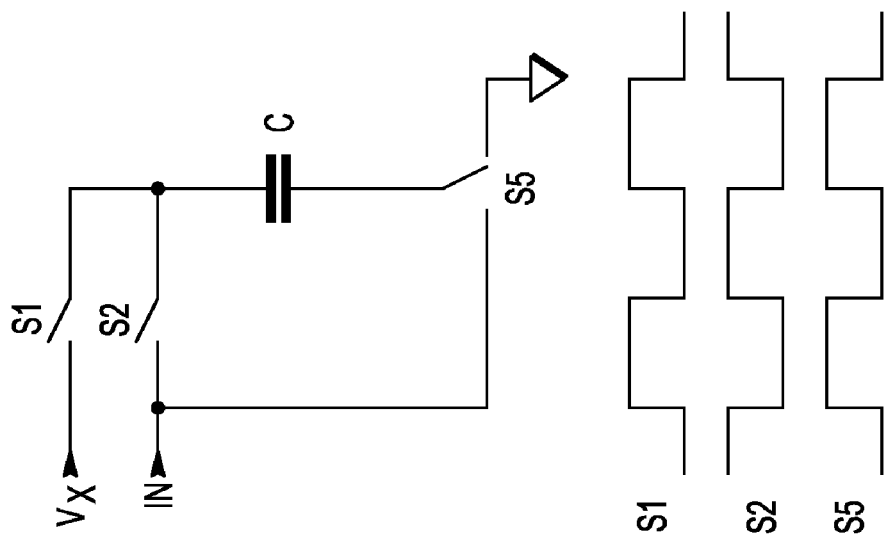
FIG. 12 is the pump sub-cell of FIG. 11 configured as an input cell for the first operational mode showing the switch control signals and their phase relationship.

FIG. 12 illustrates the pump sub-cell of FIG. 11 configured as an input sub-cell during the first mode of operation. Switches S1, S2, and S5 are active, all other switches are open and inactive. During the first clock phase S2 connects one terminal of the capacitor to the input while S5 connects the other terminal of the capacitor to Vss. During the second clock phase S1 connects one capacitor terminal to the intermediate voltage Vx while S5 connects the other capacitor terminal to the input. This is the switching relationship required for an input cell in the first operational mode.

Figure 13:
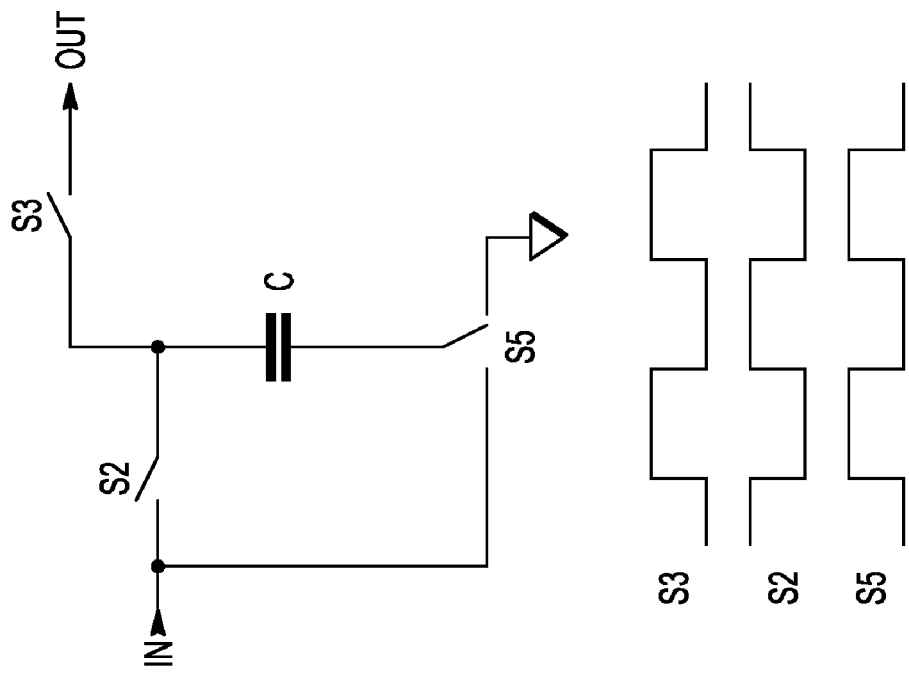
FIG. 13 is the pump sub-cell of FIG. 11 showing another configuration as an input cell for the second operational mode showing the switch control signals and their phase relationship.

For the second operational mode the pump sub-cell of FIG. 11 is optionally configured as shown in FIG. 13. During the first clock phase S2 connects one terminal of the capacitor to the input and S5 connects the other terminal of the capacitor to Vss. During the second clock phase S3 connects one terminal of the capacitor to the output and S5 connects the other terminal to the input. Unlike the first operational mode in which the charge is transferred between the input and the intermediate voltage node as shown in FIG. 12, the charge is transferred between the input and the output in the second operational node as shown in FIG. 13. If a switch is used to short the intermediate node Vx to the output FIG. 12 and FIG. 13 are equivalent.

Figure 14:
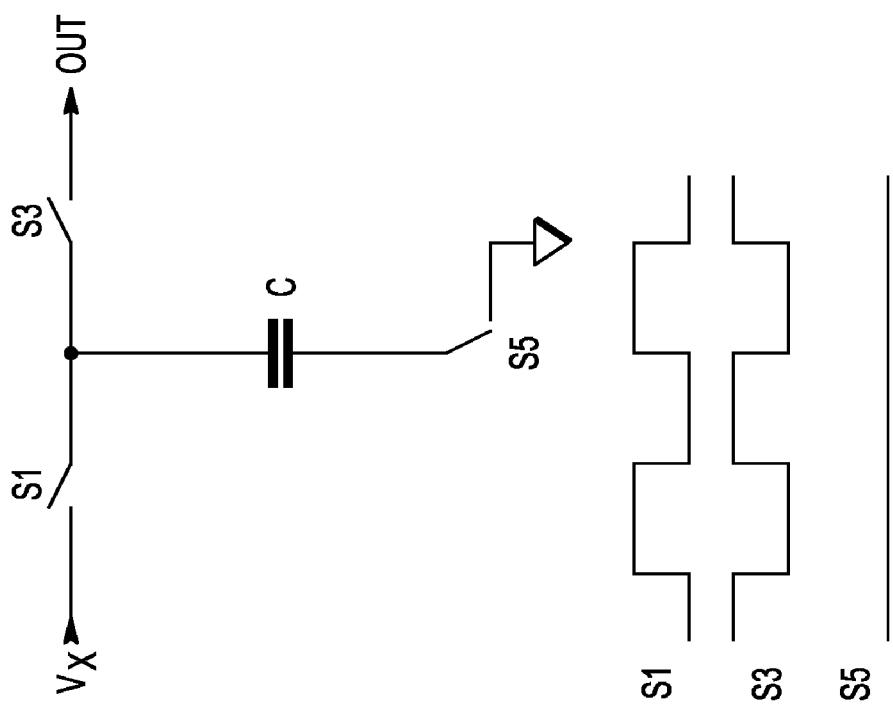
FIG. 14 is the pump sub-cell of FIG. 11 configured as a stepping cell for the first operational mode showing the switch control signals and their phase relationship.

FIG. 14 illustrates the pump sub-cell of FIG. 11 configured as a stepping cell. Switches S1 and S3 are toggled such that charge is transferred from the intermediate voltage node Vx to the output while S5 always connects one of the capacitor terminals to Vss. During one clock phase S1 connects the other capacitor terminal to the intermediate voltage Vx and during the other clock phase S3 connects the other capacitor terminal to the output.

Figure 15:
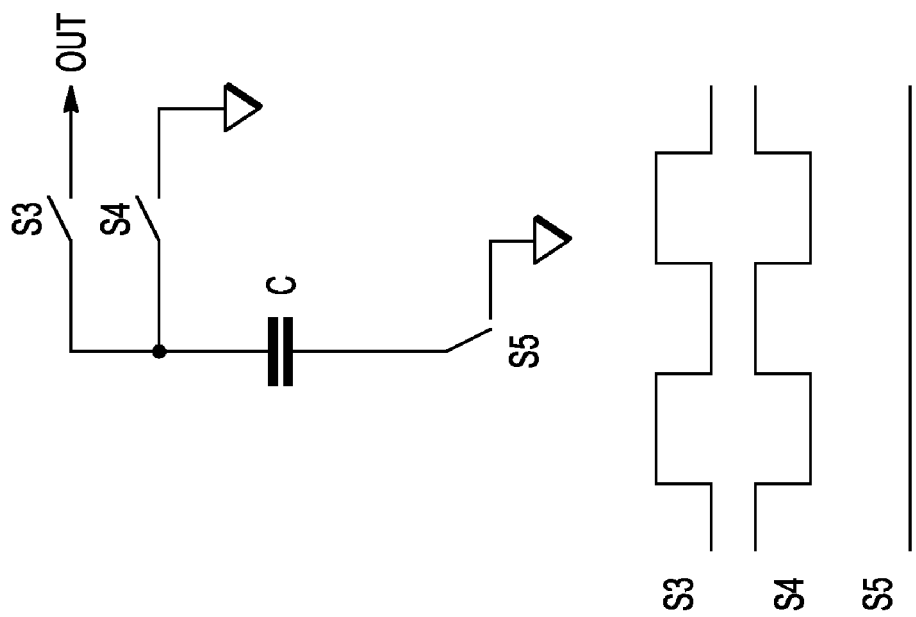
FIG. 15 is the pump sub-cell of FIG. 11 configured as a load cell for the first and second operational modes showing the switch control signals and their phase relationship.

FIG. 15 illustrates the pump sub-cell of FIG. 11 configured as a load cell. Switches S3 and S4 are toggled such that charge is transferred from the output to Vss while S5 always connects one of the capacitor terminals to Vss. During one clock phase S3 connects the other capacitor terminal to the output and during the other clock phase S4 connects the other capacitor terminal to Vss.

Figure 16:
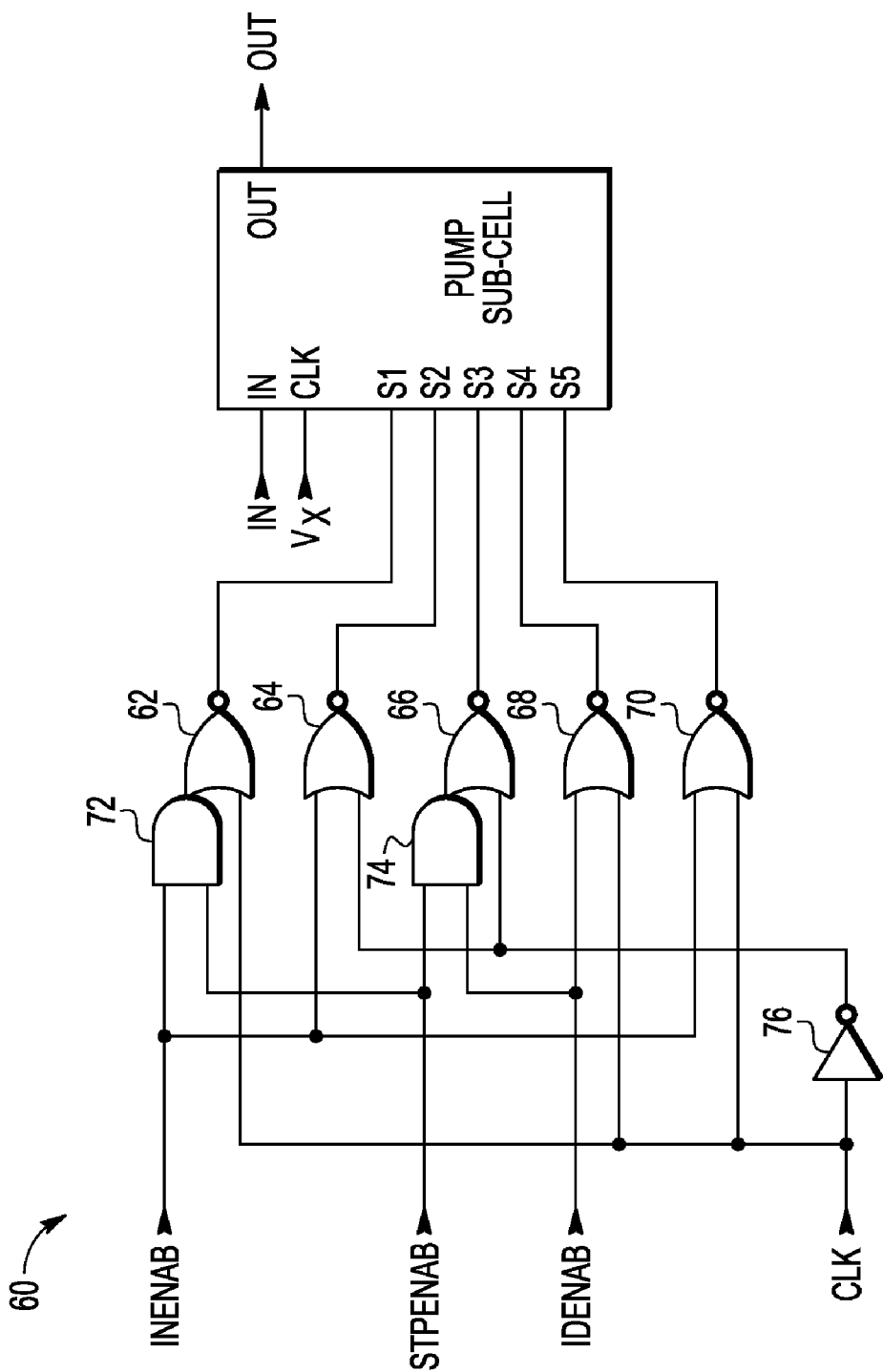
FIG. 16 is a pump cell containing the pump sub-cell of FIG. 11 and an example realization of the logic necessary to apply the control signals and the clock to the sub-cell.

FIG. 16 illustrates one possible embodiment, logic circuit 60, of the logic required to properly apply the clock to the switches in a pump sub-cell such as the sub-cell shown in FIG. 11. Logic circuit 60 comprises NOR gates 62, 64, 66, 68, and 70 having outputs controlling switches S1, S2, S3, S4, and S5, respectively, AND gates 72 and 74, and an inverter 75 for generating the inverted clock. Three mutually exclusive inputs-inenab, stpenab, and ldenab determine whether the sub-cell is configured as an input, a step, or a load cell. The logic detects which configuration is required and routes the clock to the appropriate switches with the correct phasing.

Figure 17:
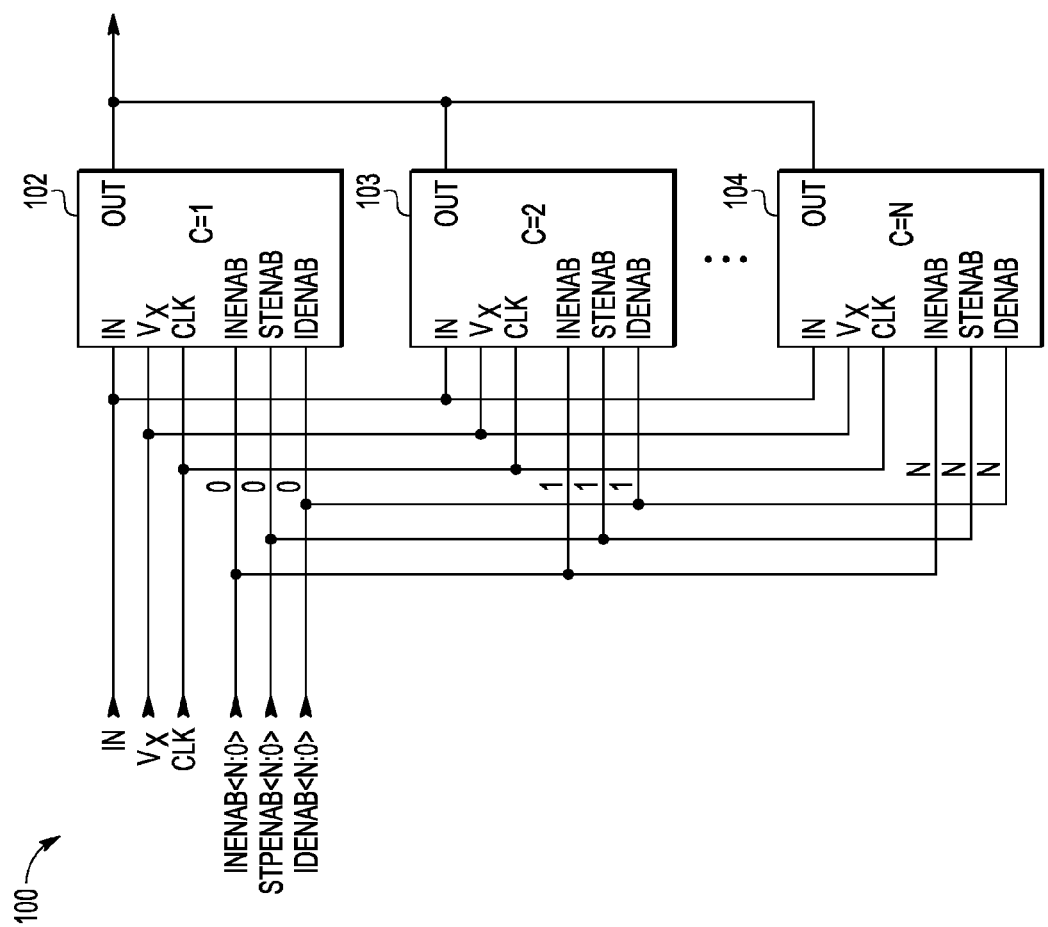
FIG. 17 is a pump block that contains a combination of the pump cells of FIG. 16.

The sub-cells, which may also be called cells or pump cells, with the associated logic can be grouped into a set 100 of pump cells 102, 102, and 104 as illustrated in FIG. 17. Like cells 30 in FIG. 2, the capacitance value in each pump cell 102-104 of FIG. 17 is different and the capacitance values in the cells are in binary relationship. Thus second cell 103 will contain twice the capacitance value of first cell 102, the third cell, which is not shown, will contain twice the capacitance value of second cell 103, and so on until the last cell, which is cell 104 in FIG. 17 and which will contain twice the capacitance value of the next to last cell. Different from cells 30 of FIG. 2, each pump cell 102-104 receives a single member of the enabling busses inenab, stpenab, and ldenab. These three busses are manipulated by regulation circuitry in response to changes in the input voltage and the load so that the correct number of input, step, and load cells are clocking in the correct operational mode to maintain a well regulated output voltage.

Figure 18:
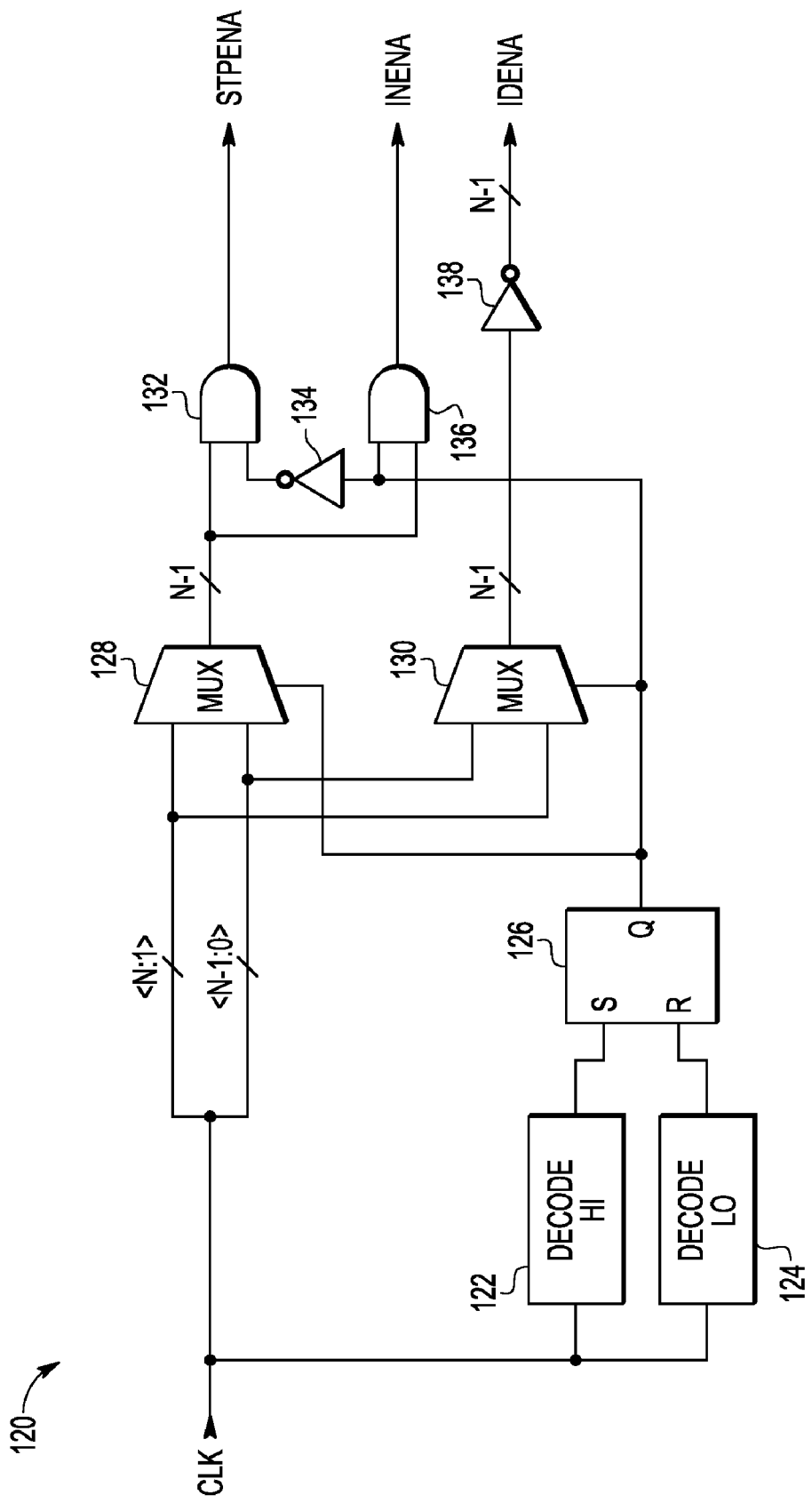
FIG. 18 is a diagram of one possible logic implementation that forms the pump block control signals from the counter output.

FIG. 18 illustrates a control block 120, which is one possible embodiment of the control circuitry that accepts the regulation counter output from counter and generates the three enabling busses inenab, stpenab, and ldenab. Control block 120 comprises a high decode circuit 122, a low decode circuit 124, an RS flip-flop 126, a mux 128, a mux 130, an AND gate 132, an inverter 134, an AND gate 136, and an inverter 138. The counter output is monitored by two decode circuits 122 and 124. Hi decode circuit 122 detects a greater value count than is detected by the second decode circuit, low decode circuit 124. Along with SR flip-flop 126 these decoders 122 and 124 detect the correct operational mode. During the first operational mode the counter output is shifted left and applied to the inenab and stpenab busses while the unshifted counter output is inverted and applied to the ldenab bus. During the second operational mode the counter output is applied directly to the inenab and stpenab busses and shifted left and inverted before application to the ldenab bus. This ensures that the change in functional mode does not affect a change in transferred charge. By detecting two different counts decoders 122 and 124 and SR Flip-Flop 126 introduce a hysteresis into the operational mode selection.

Figure 19:
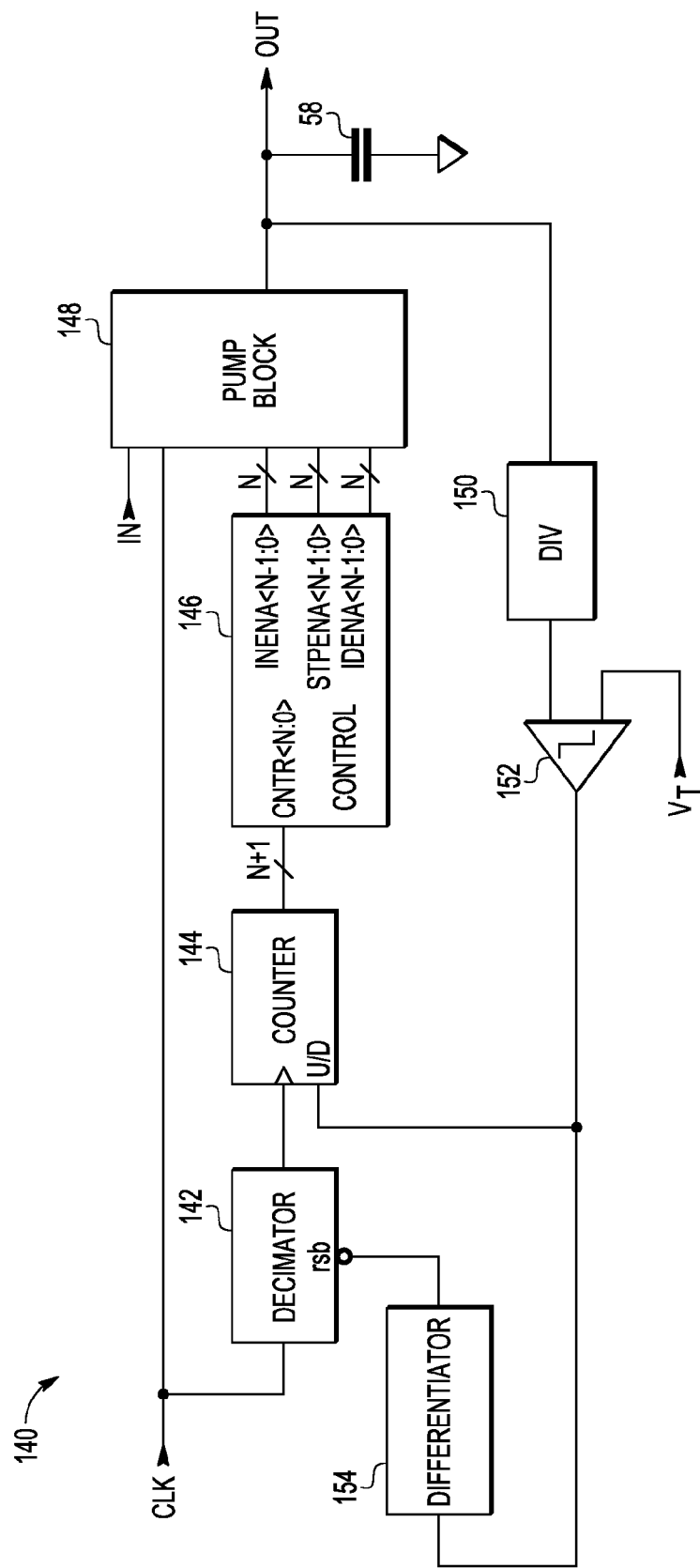
FIG. 19 is a diagram of the charge pump of FIG. 1 with the addition of the control circuitry and pump block of the present invention.

FIG. 19 is an illustration of a completed charge pump 140 comprising capacitor 58, a divide by N (Div) circuit 142, a counter 144, a control block 146, a pump blocks 148, a divider (Div) 150, a comparator 152, and a differentiator 154. Div circuit 142 receives a clock signal Clk and has an output coupled to counter 144. Counter 144 has an output coupled to a control circuit 146, a counter input coupled to the output of decimator 142, and an up/down control input coupled to the output of comparator 152. Control circuit 146 provides outputs inenab, stpenab, and ldena to pump block 148. Pump block has an input for receiving In and an output coupled to Out. Div 150 has an input coupled to Out and an output coupled to a first input of comparator 152. Comparator 152 has a second input coupled to a reference Vt and an output coupled to counter 144 and to differentiator 154. Charge pump 140 has regulation circuitry similar to that of charge pump 10 of FIG. 1 but with a new control block, control block 146, and a new pump block, pump block 148. Control block 146 as shown in FIG. 19 functions as described for control block 120 illustrated in FIG. 18.

In operation the output of comparator 152 changes state in response to a comparison of the comparison voltage with the reference voltage indicating a transition of the comparison voltage above or below the reference voltage. Differentiator 154 is configured to monitor the comparator output and produce a reset pulse each time the comparator output changes its state. Decimator 142 resets its count in response to the differentiator reset pulse. Decimator 142 has predetermined decimation count and is configured for counting a number of clock periods that occur in response to not being reset by differentiator 154. Decimator 142 provides an output signal in response to each occurrence of counting up to a multiple of the predetermined decimation count. The up/down control input of counter 144 is coupled to the comparator output which controls the up/down counter to count up or down in response to the state of the comparator output. The Counter 144 provides a counter output as a function of (i) the output signal of the decimator and (ii) the comparator output. Control circuit 146, based on the output of counter 144, detects whether the device is operating in a first predetermined mode or a second predetermined mode. In the first predetermined mode the controller configures the plurality of cells as a combination of at least one input cell, at least one stepping cell, and at least one load cell. In the second predetermined mode the controller configures the plurality of cells as a combination of at least one input cell and at least one load cell.

The first predetermined mode corresponds to a mode in which the variable input voltage is either greater than the constant output voltage or is lower than the constant output voltage up to a predetermined voltage value. The second predetermined mode corresponds to a mode of operation in which the variable input voltage is lower than the constant output voltage by a voltage greater than the predetermined voltage value. Also control circuit 146 may be configured to detect whether the device is operating in the first predetermined mode or the second predetermined mode based on both (i) a relationship between the variable input voltage and the constant output voltage, and (ii) a magnitude of a load experienced by the charge-pump, and wherein a change from the first predetermined mode to the second predetermined mode occurs at a first counter output and a change from the second predetermined mode to the first predetermined mode occurs at a second counter output different from the first counter output. As described in this example, the plurality of cells are connected in parallel.

Figure 20:
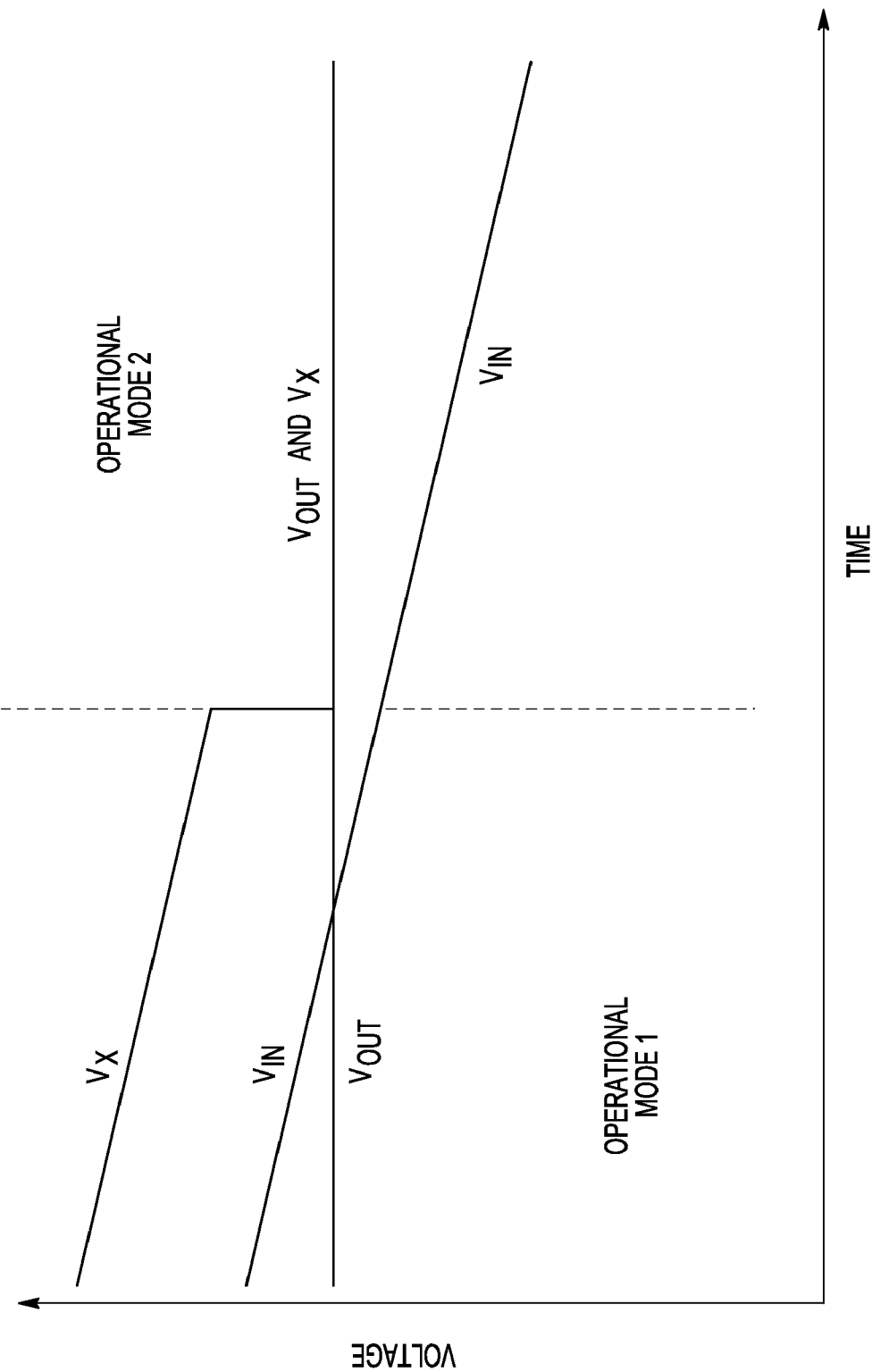
FIG. 20 is an illustration of the relationship between the various signals of the charge-based multiplier shown in FIG. 19 during the two operational modes.

FIG. 20 is an illustration of the relationship between the various voltages of the invention during the two modes of operation. In this illustration the input voltage In is varied from a value greater than the output voltage Out to a value less than the output voltage Out. When the input voltage is greater than or slightly less than the output voltage the pump is configured in the first operational mode and the intermediate voltage (Vx) is greater than the input voltage. When the counter output achieves a value detected by the decoder in the control circuit in response to a decrease of the input voltage the pump is configured for the second operational mode and the intermediate voltage (Vx) is equal to the output voltage. For any input voltage or load the output voltage is maintained at a regulated value.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A device for providing an output voltage based on a variable input voltage, the device comprising:
    a charge-pump comprising a plurality of cells, wherein each of the plurality of cells can be configured as an input cell, a stepping cell, or a load cell;
    a comparator, the comparator having (i) a first comparator input coupled to receive a reference voltage, (ii) a second comparator input coupled to receive as a comparison voltage either one of the output voltage or a fraction of the output voltage, and (iii) a comparator output, wherein the comparator output changes its state in response to a comparison of the comparison voltage with the reference voltage indicating a transition of the comparison voltage above or below the reference voltage;
    a differentiator coupled to the comparator output, wherein the differentiator is configured to monitor the comparator output and produce a reset pulse each time the comparator output changes its state;
    a decimator for receiving the reset pulse, wherein the decimator resets its count in response to the reset pulse, the decimator having a predetermined decimation count and configured for counting a number of clock periods that occur in response to not being reset by the differentiator, the decimator further providing an output signal in response to each occurrence of counting up to a multiple of the predetermined decimation count;
    an up/down counter having a counter input, an up/down control input, wherein the up/down control input is coupled to the comparator output for controlling the up/down counter to count up or down in response to the state of the comparator output, and wherein the up/down counter provides a counter output as a function of (i) the output signal of the decimator and (ii) the comparator output; and
    a controller for, based on the counter output, detecting whether the device is operating in a first predetermined mode or a second predetermined mode, wherein in the first predetermined mode the controller configures the plurality of cells as a combination of at least one input cell, at least one stepping cell, and at least one load cell, and wherein in the second predetermined mode the controller configures the plurality of cells as a combination of at least one input cell and at least one load cell.

2. The device of claim 1, wherein the first predetermined mode corresponds to a mode of operation of the device in which the variable input voltage is either greater than a constant output voltage or is lower than the constant output voltage up to a predetermined voltage value, and wherein the second predetermined mode corresponds to a mode of operation of the device in which the variable input voltage is lower than the constant output voltage by a voltage greater than the predetermined voltage value.

3. The device of claim 1, wherein the controller is configured to detect whether the device is operating in the first predetermined mode or the second predetermined mode based on both (i) a relationship between the variable input voltage and the constant output voltage, and (ii) a magnitude of a load experienced by the charge-pump, and wherein a change from the first predetermined mode to the second predetermined mode occurs at a first counter output and a change from the second predetermined mode to the first predetermined mode occurs at a second counter output different from the first counter output.

4. The device of claim 1, wherein the plurality of cells are connected in parallel.

5. The device of claim 1, wherein the charge-pump comprises a first node for receiving the variable input voltage, a second node for generating an intermediate voltage, and a third node for providing the constant output voltage.

6. The device of claim 5, wherein each of the plurality of cells comprises a capacitor having a first terminal and a second terminal, wherein the first terminal is connected to a first switch, wherein the first switch can be used to connect the first terminal to either the variable input voltage or a ground voltage, wherein the second terminal is connected to a plurality of switches, and wherein the plurality of switches can be used to connect the second terminal to one of the variable input voltage, the intermediate voltage, the constant output voltage, and the ground voltage.

7. The device of claim 6, wherein the controller is configured to control a state of each of the first switch and the plurality of switches, wherein the state relates to whether a respective switch is open or closed.

8. The device of claim 6, wherein the controller is for configuring at least one of the plurality of cells as the input cell in the first predetermined mode of operation by (i) configuring the first switch to connect the first terminal alternately to the variable input voltage and the ground voltage, and (ii) configuring a second switch to connect the second terminal alternately to one of the variable input voltage and the intermediate voltage.

9. The device of claim 6, wherein the controller is for configuring at least one of the plurality of cells as a stepper cell in the first predetermined mode of operation by (i) configuring the first switch to connect the first terminal to the ground voltage, and (ii) configuring the second switch to connect the second terminal alternately to one of the intermediate voltage and the constant output voltage.

10. The device of claim 6, wherein the controller is for configuring at least one of the plurality of cells as the load cell in both the first predetermined mode of operation and the second predetermined mode of operation by (i) configuring the first switch to connect the first terminal to the ground voltage, and (ii) configuring the second switch to connect the second terminal alternately to one of the constant output voltage and the ground voltage.

11. The device of claim 6, wherein the controller is for configuring at least one of the plurality of cells as the input cell in the second predetermined mode of operation by (i) configuring the first switch to connect the first terminal alternately to the variable input voltage and the ground voltage, and (ii) configuring the second plurality of switches to connect the second terminal alternately to one of the variable input voltage and the constant output voltage.

12. A device for providing an output voltage based on a variable input voltage, the device comprising:
- a charge-pump comprising a plurality of cells, wherein each of the plurality of cells can be configured as an input cell, a stepping cell, or a load cell;
- a comparator, the comparator having (i) a first comparator input coupled to receive a reference voltage, (ii) a second comparator input coupled to receive as a comparison voltage either one of the output voltage or a fraction of the output voltage, and (iii) a comparator output, wherein the comparator output changes its state in response to a comparison of the comparison voltage with the reference voltage indicating a transition of the comparison voltage above or below the reference voltage;
- a differentiator coupled to the comparator output, wherein the differentiator is configured to monitor the comparator output and produce a reset pulse each time the comparator output changes its state;
- a decimator for receiving the reset pulse, wherein the decimator resets its count in response to the reset pulse, the decimator having a predetermined decimation count and configured for counting a number of clock periods that occur in response to not being reset by the differentiator, the decimator further providing an output signal in response to each occurrence of counting up to a multiple of the predetermined decimation count;
- an up/down counter having a counter input, an up/down control input, wherein the up/down control input is coupled to the comparator output for controlling the up/down counter to count up or down in response to a state of the comparator output, and wherein the up/down counter provides a counter output as a function of (i) the output signal of the decimator and (ii) the comparator output; and
- a controller for, based on the counter output, detecting whether the device is operating in a first predetermined mode or a second predetermined mode, wherein the first predetermined mode corresponds to a mode of operation of the device in which the variable input voltage is either greater than a constant output voltage or is lower than the constant output voltage up to a predetermined voltage value, and wherein the second predetermined mode corresponds to a mode of operation of the device in which the variable input voltage is lower than the constant output voltage by a voltage greater than the predetermined voltage value.

13. The device of claim 12, wherein the charge-pump comprises a first node for receiving the variable input voltage, a second node for generating an intermediate voltage, and a third node for providing the constant output voltage.

14. The device of claim 13, wherein each of the plurality of cells comprises a capacitor having a first terminal and a second terminal, wherein the first terminal is connected to a first switch, wherein the first switch can be used to connect the first terminal to either the variable input voltage or a ground voltage, wherein the second terminal is connected to a plurality of switches, and wherein the plurality of switches can be used to connect the second terminal to one of the variable input voltage, the intermediate voltage, the constant output voltage, and the ground voltage.

15. The device of claim 14, wherein the controller is for configuring at least one of the plurality of cells as the input cell in the first predetermined mode of operation by (i) configuring the first switch to connect the first terminal alternately to the variable input voltage and the ground voltage, and (ii) configuring a second switch to connect the second terminal alternately to one of the variable input voltage and the intermediate voltage.

16. The device of claim 14, wherein the controller is for configuring at least one of the plurality of cells as a stepper cell in the first predetermined mode of operation by (i) configuring the first switch to connect the first terminal to the ground voltage, and (ii) configuring the second switch to connect the second terminal alternately to one of the intermediate voltage and the constant output voltage.

17. The device of claim 14, wherein the controller is for configuring at least one of the plurality of cells as the load cell in both the first predetermined mode of operation and the second predetermined mode of operation by (i) configuring the first switch to connect the first terminal to the ground voltage, and (ii) configuring the second switch to connect the second terminal alternately to one of the constant output voltage and the ground voltage.

18. The device of claim 14, wherein the controller is for configuring at least one of the plurality of cells as the input cell in the second predetermined mode of operation by (i) configuring the first switch to connect the first terminal alternately to the variable input voltage and the ground voltage, and (ii) configuring the second switch to connect the second terminal alternately to one of the variable input voltage and the constant output voltage.

19. A device for providing an output voltage based on a variable input voltage, the device comprising:
- a charge-pump comprising a plurality of cells, wherein each of the plurality of cells can be configured as an input cell, a stepping cell, or a load cell, wherein the charge-pump comprises a first node for receiving the variable input voltage, a second node for generating an intermediate voltage, and a third node for providing a constant output voltage, and wherein each of the plurality of cells comprises a capacitor having a first terminal and a second terminal, wherein the first terminal is connected to a first switch, wherein the first switch can be used to connect the first terminal to either the variable input voltage or a ground voltage, wherein the second terminal is connected to a plurality of switches, and wherein the plurality of switches can be used to connect the second terminal to one of the variable input voltage, the intermediate voltage, the constant output voltage, and the ground voltage;
- a comparator, the comparator having (i) a first comparator input coupled to receive a reference voltage, (ii) a second comparator input coupled to receive as a comparison voltage either one of the output voltage or a fraction of the output voltage, and (iii) a comparator output, wherein the comparator output changes its state in response to a comparison of the comparison voltage with the reference voltage indicating a transition of the comparison voltage above or below the reference voltage;
- a differentiator coupled to the comparator output, wherein the differentiator is configured to monitor the comparator output and produce a reset pulse each time the comparator output changes its state;
- a decimator for receiving the reset pulse, wherein the decimator resets its count in response to the reset pulse, the decimator having a predetermined decimation count and configured for counting a number of clock periods that occur in response to not being reset by the differentiator, the decimator further providing an output signal in response to each occurrence of counting up to a multiple of the predetermined decimation count;

an up/down counter having a counter input, an up/down control input, wherein the up/down control input is coupled to the comparator output for controlling the up/down counter to count up or down in response to a state of the comparator output, and wherein the up/down counter provides a counter output as a function of (i) the output signal of the decimator and (ii) the comparator output; and a controller for, based on the counter output, detecting whether the device is operating in a first predetermined mode or a second predetermined mode, and wherein the controller is further configured to control a state of each of the first switch and the plurality of switches.

20. The device of claim 19, wherein the plurality of cells are connected in parallel.

* * * * *